UNITED STATES PATENT OFFICE.

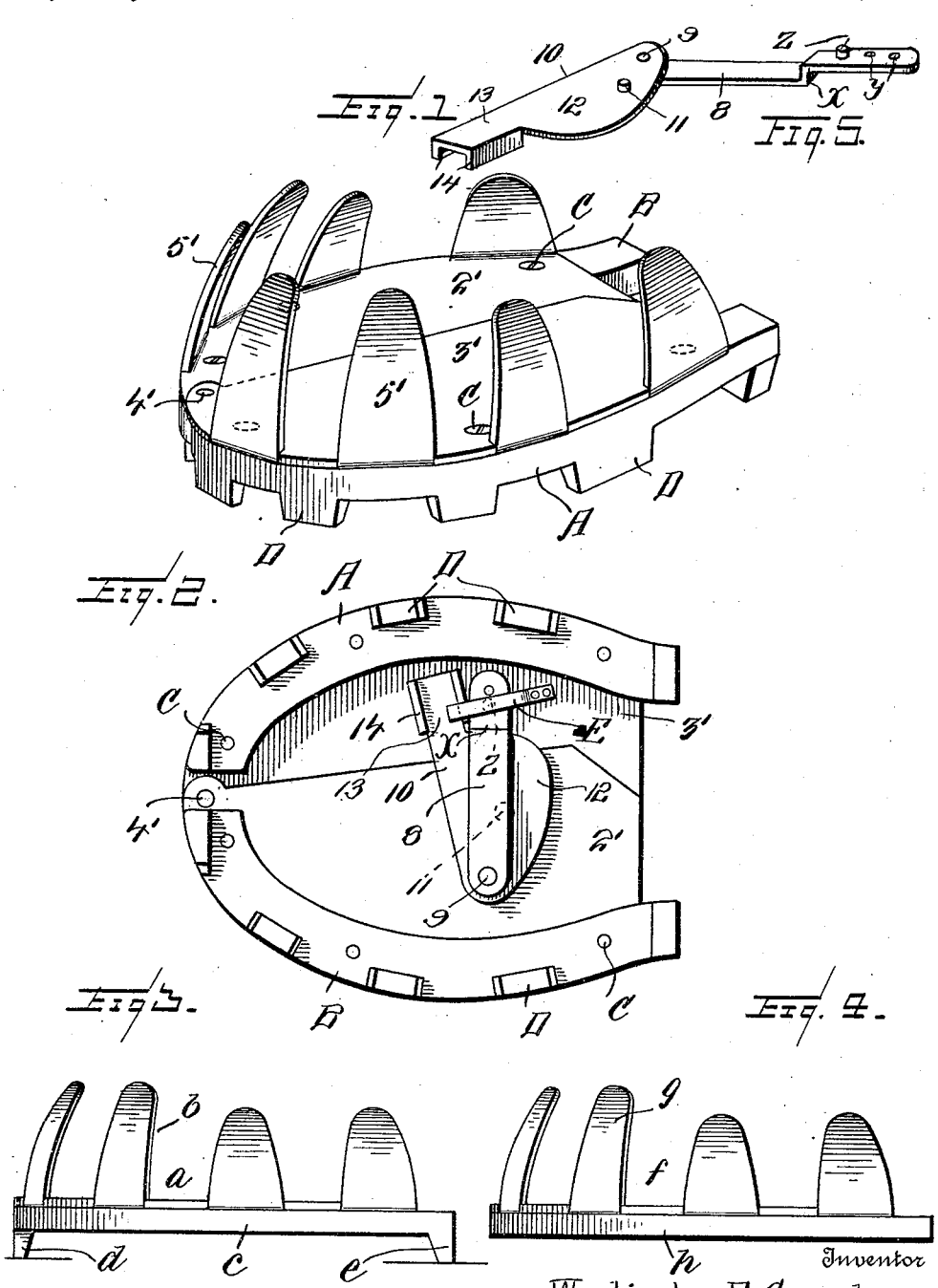

WASHINGTON E. SPANGLER, OF ARLINGTON, VIRGINIA.

HORSESHOE.

1,008,214.  Specification of Letters Patent.  Patented Nov. 7, 1911.

Application filed August 16, 1910. Serial No. 577,430.

*To all whom it may concern:*

Be it known that I, WASHINGTON E. SPANGLER, a citizen of the United States, residing at Arlington, in the county of Alexandria and State of Virginia, have invented new and useful Improvements in Horseshoes, of which the following is a specification.

This invention relates to anti-slipping devices for horseshoes and the object of the invention is to provide a device of this character which may be easily and quickly positioned upon a horse's shoe and may be as quickly and readily detached therefrom, when desired.

With the above object in view, the invention resides in the novel construction and arrangement of parts hereinafter fully described and claimed.

In the accompanying drawings, Figure 1 is a perspective view of the improvement. Fig. 2 is a bottom plan view of the same. Fig. 3 is a side elevation of a modified form of the device. Fig. 4 is a similar view of a still further modification. Fig. 5 is a perspective view of the locking device.

The improvement contemplates the employment of a pair of flattened plates and in Figs. 1 and 2 of the drawings these plates are designated by the numerals 2′ and 3′ respectively. The plate 3′ has its forward end provided with a lip, the same having an opening which is adapted to register with a similar opening provided upon an offset portion or lip formed upon the forward portion of the plate 2′. These alining openings are adapted for the reception of a pivot member 4′. The plates have their side edges each integrally formed with upturned spring clamping fingers 5′, and the outer edges of the plates are each of an arcuate formation, corresponding to the contour of the horse's hoof. Each of the plates is provided adjacent its periphery with an enlarged member designated respectively by the letters A and B. These members A and B are connected with the plates through the medium of removable securing elements such as screws C. The members A and B are each substantially in the form of half a horse's shoe and each of the said members is provided with depending calks designated by the letter D. By reference to Fig. 2 of the drawings, it will be noted that the upper plate 3′ overlies the lower plate 2′, so that snow or the like cannot obtain an entrance between the plates and form itself into a hard ball beneath the hoof of the animal and thereby injure the animal. The locking device, more clearly illustrated in Fig. 5 of the drawings, comprises a pair of members designated by the numerals 8 and 10. These members are pivotally connected as at 9, and the member 10 is formed with an enlarged cam-shaped body 12 from which extends a reduced portion 13 having its ends turned down to provide the walls 14. The member 10 is provided with a pintle 11 whereby the said member is pivotally connected to the plate 2′. The member 8 comprises what may be termed a link which is provided with an offset extension as indicated by the letter X, and the said extension is provided with a plurality of spaced openings Y, any one of which is adapted for the reception of a pivot Z carried by the plate 3′. It is to be understood that the pivot Z is removable so as to provide for variations of the width of the swinging of the members 2′ and 3′ upon their pivot 4′. The plate 3′ is further provided with a flattened spring catch E which is adapted to engage with the innermost offset wall 14 of the cam lever 10 when the said lever is swung upon its pivot so as to have its upper cam edge underlie and engage with the wall formed by the offset extension of the link 8, and thus retain the members 8 and 10 in a securely locked position.

In Fig. 3 I have illustrated a modified form of the device. In this figure the plates *a* are provided with integrally formed resilient clamping fingers *b* and the plate has its other surface provided with a pair of half horseshoes *c* which are connected thereto through the medium of removable retaining members such as screws or the like. The half horseshoes *c* are each provided with a toe calk *d* and a heel calk *e*, the intermediate calks being omitted. The clamping device is similar to that heretofore described.

In Fig. 4 the plates *f* are provided with integrally formed inwardly bent clamping fingers *g* and the peripheries of the said plates are provided with smooth enlargements, each in the form of half a horseshoe.

The device dispenses with the employment of calks, but in other respects is similar to the device heretofore described.

Having thus fully described the invention, what I claim as new, is:—

1. In a device for the purpose set forth, a pair of members having flattened bodies, the perimeter of each of the members being of a rounded formation and being formed with upwardly extending spring fingers, a removable enlargement secured to the under face of each of the members adjacent its perimeter, the members having their front portions pivotally connected together adjacent the ends of the removable enlargements, one of the members adapted to overlie the second member when the members are in their closed position, a cam lever pivotally connected with one of the members, the said lever being formed with an extending portion having a longitudinal offset wall, a link having an offset extension pivotally connected with the cam lever and also connected with the second member of the device, the pivoted cam lever adapted to engage the offset of the link, and a resilient element for retaining the cam lever in a locked position upon the link.

2. In a device for the purpose set forth, a pair of plates one adapted to overlie the other, said plates having their front portions pivotally connected together, each of said plates having its perimeter formed with resilient fingers, said plates having their under faces adjacent their perimeters formed with removable enlargements, calks for the said enlargements, a locking member for the plates, said locking member comprising a link pivotally connected with one of the plates and a cam lever pivotally connected with the second plate and with the link, the link being provided with an offset portion adapted to ride upon and engage the cam surface of the lever, and resilient means for securing the lever and link in locked position.

3. In a device for the purpose set forth, a pair of plates, the perimeter of each of the plates being of a rounded formation and being formed with upwardly extending spring fingers, a removable enlargement connected with the under face of each of the plates adjacent its perimeter, calks connected with the enlargements, the plates having their front portions pivotally connected together between the adjacent front portions of the enlargements, one of said plates adapted to overlie the second plate when the plates are in their closed position, a cam lever pivotally connected with one of the plates, said lever being formed with an extending portion having longitudinally offset walls, an offset link pivotally connected with the cam lever and also pivotally connected with the second plate, the pivoted cam lever adapted to engage the offset of the link, and a resilient element for retaining the cam lever in a locked position upon the link.

In testimony whereof I affix my signature in presence of two witnesses.

WASHINGTON E. SPANGLER.

Witnesses:
BENNETT S. JONES,
K. ALLEN.

---

Copies of this patent may be obtained for five cents each, by addressing the "Commissioner of Patents, Washington, D. C."